(12) United States Patent
Upton (10) Patent No.: US 7,552,443 B2
(45) Date of Patent: *Jun. 23, 2009

(54) SYSTEM AND METHOD FOR IMPLEMENTING AN EVENT ADAPTER

(75) Inventor: Mitch Upton, Highlands Ranch, CO (US)

(73) Assignee: Bea Systems, Inc., Redwood Shores, CA (US)

( * ) Notice: Subject to any disclaimer, the term of this patent is extended or adjusted under 35 U.S.C. 154(b) by 348 days.

This patent is subject to a terminal disclaimer.

(21) Appl. No.: 10/271,157

(22) Filed: Oct. 15, 2002

(65) Prior Publication Data
US 2003/0093403 A1 May 15, 2003

Related U.S. Application Data

(60) Provisional application No. 60/347,919, filed on Oct. 18, 2001, provisional application No. 60/347,901, filed on Oct. 18, 2001.

(51) Int. Cl.
*G06F 9/44* (2006.01)
(52) U.S. Cl. .................. 719/315; 707/102; 719/328
(58) Field of Classification Search ......... 719/310–316, 719/328, 330, 318; 707/101, 104, 109, 102; 717/109, 120, 123
See application file for complete search history.

(56) References Cited

U.S. PATENT DOCUMENTS

| | | | |
|---|---|---|---|
| 5,321,841 A | 6/1994 | East et al. ................ 395/725 |
| 5,469,562 A | 11/1995 | Saether | |
| 5,604,860 A | 2/1997 | McLaughlin et al. | |
| 5,630,131 A | 5/1997 | Palevich et al. | |
| 5,748,975 A | 5/1998 | Van De Vanter ........... 395/793 |
| 5,801,958 A | 9/1998 | Dangelo et al. | |
| 5,835,769 A | 11/1998 | Jervis et al. .............. 395/701 |
| 5,836,014 A | 11/1998 | Faiman, Jr. .............. 395/707 |
| 5,862,327 A | 1/1999 | Kwang et al. .......... 395/200.33 |
| 5,867,822 A * | 2/1999 | Sankar ........................ 705/8 |
| 5,933,838 A | 8/1999 | Lomet ....................... 707/202 |

(Continued)

FOREIGN PATENT DOCUMENTS

EP      1 006 443   A2    6/2000

(Continued)

OTHER PUBLICATIONS

Allamaraju, et al., "Professional Java Server Programming 2EE 1.3 Edition," WROX, pp. 1009-1057 (Sep. 2001).

(Continued)

*Primary Examiner*—Van H Nguyen
(74) *Attorney, Agent, or Firm*—Fliesler Meyer LLP (57) ABSTRACT

Events can be extracted from a resource such as an enterprise system using an application view component in combination with an event adapter. The event can be pulled by a client application or pushed by the enterprise system. The application view component can provide an interface to the enterprise system for the client application. The event adapter allows the enterprise system to initiate communication with, or receive communication from, the client application. The event adapter can extract data about the event from the enterprise system, create an object such as an XML-based object containing the data, and notify the application view component. The application view component can pass the event to the client application.

38 Claims, 4 Drawing Sheets

U.S. PATENT DOCUMENTS

| | | | | |
|---|---|---|---|---|
| 5,944,794 | A | 8/1999 | Okamoto et al. | |
| 5,950,010 | A | 9/1999 | Hesse et al. | 395/712 |
| 5,961,593 | A | 10/1999 | Gabber et al. | 709/219 |
| 5,966,535 | A | 10/1999 | Benedikt et al. | |
| 6,012,083 | A | 1/2000 | Savitzky et al. | |
| 6,016,495 | A | 1/2000 | McKeehan et al. | |
| 6,018,730 | A | 1/2000 | Nichols et al. | |
| 6,023,578 | A | 2/2000 | Birsan et al. | |
| 6,023,722 | A | 2/2000 | Colyer | 709/201 |
| 6,028,997 | A | 2/2000 | Leymann et al. | |
| 6,029,000 | A | 2/2000 | Woolsey et al. | |
| 6,044,217 | A | 3/2000 | Brealey et al. | 395/701 |
| 6,067,623 | A | 5/2000 | Blakley, III et al. | 713/204 |
| 6,070,184 | A | 5/2000 | Blount et al. | |
| 6,085,030 | A | 7/2000 | Whitehead et al. | 395/200.33 |
| 6,092,102 | A * | 7/2000 | Wagner | 340/7.29 |
| 6,119,149 | A | 9/2000 | Notani | 709/205 |
| 6,125,363 | A | 9/2000 | Buzzeo et al. | |
| 6,141,686 | A | 10/2000 | Jackowski et al. | 709/224 |
| 6,141,701 | A | 10/2000 | Whitney | |
| 6,154,738 | A | 11/2000 | Call | |
| 6,154,786 | A * | 11/2000 | Williamson et al. | 719/615 |
| 6,189,044 | B1 | 2/2001 | Thomson et al. | |
| 6,212,546 | B1 | 4/2001 | Starkovich et al. | |
| 6,222,533 | B1 | 4/2001 | Notani | 345/329 |
| 6,226,675 | B1 | 5/2001 | Meltzer et al. | 709/223 |
| 6,226,788 | B1 | 5/2001 | Schoening et al. | |
| 6,230,287 | B1 | 5/2001 | Pinard et al. | 714/31 |
| 6,230,309 | B1 | 5/2001 | Turner et al. | |
| 6,237,041 | B1 * | 5/2001 | Håål et al. | 709/246 |
| 6,237,135 | B1 | 5/2001 | Timbol | |
| 6,243,737 | B1 | 6/2001 | Flanagan et al. | |
| 6,256,676 | B1 * | 7/2001 | Taylor et al. | 709/246 |
| 6,269,373 | B1 | 7/2001 | Apte et al. | |
| 6,282,711 | B1 | 8/2001 | Halpern et al. | 717/11 |
| 6,292,932 | B1 | 9/2001 | Baisley et al. | |
| 6,311,327 | B1 | 10/2001 | O'Brien et al. | |
| 6,324,681 | B1 | 11/2001 | Sebesta | 717/1 |
| 6,330,569 | B1 | 12/2001 | Baisley et al. | |
| 6,334,114 | B1 | 12/2001 | Jacobs et al. | |
| 6,336,122 | B1 | 1/2002 | Lee et al. | 707/204 |
| 6,338,064 | B1 | 1/2002 | Ault et al. | 707/9 |
| 6,343,265 | B1 | 1/2002 | Glebov et al. | |
| 6,345,283 | B1 | 2/2002 | Anderson | |
| 6,348,970 | B1 | 2/2002 | Marx | |
| 6,349,408 | B1 | 2/2002 | Smith | 717/11 |
| 6,353,923 | B1 | 3/2002 | Bogle et al. | 717/4 |
| 6,356,906 | B1 | 3/2002 | Lippert et al. | |
| 6,360,221 | B1 | 3/2002 | Gough et al. | |
| 6,360,358 | B1 | 3/2002 | Elsbree et al. | |
| 6,367,068 | B1 | 4/2002 | Vaidyanathan et al. | |
| 6,377,939 | B1 | 4/2002 | Young | |
| 6,393,605 | B1 | 5/2002 | Loomans | 717/121 |
| 6,408,311 | B1 | 6/2002 | Baisley et al. | |
| 6,411,698 | B1 | 6/2002 | Bauer et al. | |
| 6,438,594 | B1 | 8/2002 | Bowman-Amuah | |
| 6,445,711 | B1 | 9/2002 | Scheel et al. | |
| 6,463,503 | B1 | 10/2002 | Jones et al. | 711/114 |
| 6,470,364 | B1 | 10/2002 | Prinzing | |
| 6,516,322 | B1 | 2/2003 | Meredith | |
| 6,529,909 | B1 * | 3/2003 | Bowman-Amuah | 707/10 |
| 6,549,949 | B1 | 4/2003 | Bowman-Amuah | 709/236 |
| 6,560,636 | B2 | 5/2003 | Cohen et al. | |
| 6,560,769 | B1 | 5/2003 | Moore et al. | |
| 6,567,738 | B2 * | 5/2003 | Gopp et al. | 701/109 |
| 6,584,454 | B1 | 6/2003 | Hummel, Jr. et al. | |
| 6,594,693 | B1 | 7/2003 | Borwankar | |
| 6,594,700 | B1 | 7/2003 | Graham et al. | |
| 6,601,113 | B1 | 7/2003 | Koistinen et al. | |
| 6,604,198 | B1 | 8/2003 | Beckman et al. | 713/167 |
| 6,609,115 | B1 | 8/2003 | Mehring et al. | |
| 6,615,258 | B1 | 9/2003 | Barry et al. | |
| 6,636,491 | B1 | 10/2003 | Kari et al. | |
| 6,637,020 | B1 | 10/2003 | Hammond | |
| 6,643,652 | B2 | 11/2003 | Helgeson et al. | |
| 6,654,932 | B1 | 11/2003 | Bahrs et al. | |
| 6,658,487 | B1 * | 12/2003 | Smith | 719/318 |
| 6,678,518 | B2 | 1/2004 | Eerola | |
| 6,684,388 | B1 | 1/2004 | Gupta et al. | |
| 6,687,702 | B2 | 2/2004 | Vaitheeswaran et al. | |
| 6,687,848 | B1 | 2/2004 | Najmi | |
| 6,721,740 | B1 | 4/2004 | Skinner et al. | |
| 6,721,747 | B2 | 4/2004 | Lipkin | |
| 6,721,779 | B1 | 4/2004 | Maffeis | |
| 6,732,237 | B1 | 5/2004 | Jacobs et al. | 711/119 |
| 6,738,975 | B1 * | 5/2004 | Yee et al. | 719/310 |
| 6,748,420 | B1 | 6/2004 | Quatrano et al. | |
| 6,754,884 | B1 | 6/2004 | Lucas et al. | |
| 6,757,689 | B2 * | 6/2004 | Battas et al. | 707/101 |
| 6,789,054 | B1 | 9/2004 | Makhlouf | |
| 6,795,967 | B1 | 9/2004 | Evans et al. | 719/310 |
| 6,799,718 | B2 | 10/2004 | Chan et al. | |
| 6,802,000 | B1 | 10/2004 | Greene et al. | 713/168 |
| 6,804,686 | B1 | 10/2004 | Stone et al. | 707/104.1 |
| 6,823,495 | B1 | 11/2004 | Vedula et al. | |
| 6,832,238 | B1 | 12/2004 | Sharma et al. | |
| 6,836,883 | B1 | 12/2004 | Abrams et al. | |
| 6,850,979 | B1 | 2/2005 | Saulpaugh et al. | |
| 6,874,143 | B1 | 3/2005 | Murray et al. | |
| 6,877,023 | B1 | 4/2005 | Maffeis et al. | |
| 6,889,244 | B1 | 5/2005 | Gaither et al. | |
| 6,910,041 | B2 | 6/2005 | Exton et al. | |
| 6,912,718 | B1 * | 6/2005 | Chang et al. | 719/318 |
| 6,915,519 | B2 | 7/2005 | Williamson et al. | |
| 6,918,084 | B1 | 7/2005 | Slaughter et al. | |
| 6,925,482 | B2 | 8/2005 | Gopal et al. | |
| 6,959,307 | B2 * | 10/2005 | Apte | 707/104.1 |
| 6,959,340 | B1 | 10/2005 | Najmi | |
| 6,963,914 | B1 | 11/2005 | Breitbart et al. | |
| 6,971,096 | B1 | 11/2005 | Ankireddipally et al. | |
| 6,976,086 | B2 | 12/2005 | Sadeghi et al. | |
| 6,983,328 | B2 | 1/2006 | Beged-Dov et al. | |
| 6,985,939 | B2 | 1/2006 | Fletcher et al. | |
| 6,993,743 | B2 | 1/2006 | Crupi et al. | |
| 7,010,793 | B1 * | 3/2006 | Chatterjee et al. | 719/316 |
| 7,017,146 | B2 | 3/2006 | Dellarocas | |
| 7,051,072 | B2 | 5/2006 | Stewart et al. | |
| 7,051,316 | B2 | 5/2006 | Charisius et al. | |
| 7,054,858 | B2 | 5/2006 | Sutherland | |
| 7,069,507 | B1 | 6/2006 | Alcazar et al. | |
| 7,072,934 | B2 | 7/2006 | Helgeson et al. | |
| 7,073,167 | B2 | 7/2006 | Iwashita | |
| 7,089,584 | B1 | 8/2006 | Sharma | |
| 7,107,578 | B1 | 9/2006 | Alpern | |
| 7,117,504 | B2 | 10/2006 | Smith | |
| 7,127,704 | B2 | 10/2006 | Van De Vanter et al. | |
| 7,134,072 | B1 | 11/2006 | Lovett et al. | |
| 7,143,186 | B2 | 11/2006 | Stewart et al. | |
| 7,146,422 | B1 | 12/2006 | Marlatt et al. | |
| 7,150,015 | B2 | 12/2006 | Pace et al. | |
| 7,165,041 | B1 | 1/2007 | Guheen et al. | |
| 7,184,967 | B1 | 2/2007 | Mital et al. | |
| 7,231,421 | B2 | 6/2007 | Kawakura et al. | |
| 7,406,664 | B1 | 7/2008 | Morton et al. | |
| 2001/0032263 | A1 | 10/2001 | Gopal et al. | |
| 2002/0004848 | A1 | 1/2002 | Sudarshan et al. | |
| 2002/0010781 | A1 | 1/2002 | Tuatini | |
| 2002/0010803 | A1 | 1/2002 | Oberstein et al. | |
| 2002/0016759 | A1 | 2/2002 | Marcready et al. | |
| 2002/0073080 | A1 | 6/2002 | Lipkin | |
| 2002/0078365 | A1 | 6/2002 | Burnette et al. | |
| 2002/0083075 | A1 | 6/2002 | Brummel et al. | |
| 2002/0111922 | A1 | 8/2002 | Young et al. | |
| 2002/0116454 | A1 * | 8/2002 | Dyla et al. | 709/203 |

| | | | |
|---|---|---|---|
| 2002/0120685 A1 | 8/2002 | Srivastava et al. | |
| 2002/0138582 A1* | 9/2002 | Chandra et al. | 709/206 |
| 2002/0143960 A1 | 10/2002 | Goren et al. | |
| 2002/0152106 A1 | 10/2002 | Stoxen et al. | |
| 2002/0161826 A1 | 10/2002 | Arteaga et al. | |
| 2002/0165936 A1 | 11/2002 | Alston et al. | |
| 2002/0169644 A1 | 11/2002 | Greene | |
| 2002/0174178 A1 | 11/2002 | Stawikowski | |
| 2002/0184145 A1 | 12/2002 | Sijacic et al. | |
| 2002/0184610 A1 | 12/2002 | Chong et al. | |
| 2002/0194221 A1 | 12/2002 | Strong et al. | |
| 2002/0194244 A1 | 12/2002 | Raventos | |
| 2002/0194267 A1 | 12/2002 | Flesner et al. | |
| 2002/0194495 A1 | 12/2002 | Gladstone et al. | |
| 2003/0004746 A1 | 1/2003 | Kheirolomoom et al. | |
| 2003/0005181 A1 | 1/2003 | Bau, III et al. | |
| 2003/0014439 A1 | 1/2003 | Boughannam | |
| 2003/0018661 A1 | 1/2003 | Darugar | |
| 2003/0018665 A1 | 1/2003 | Dovin et al. | |
| 2003/0018832 A1 | 1/2003 | Amirisetty et al. | |
| 2003/0018963 A1 | 1/2003 | Ashworth et al. | |
| 2003/0023957 A1 | 1/2003 | Bau et al. | |
| 2003/0041050 A1 | 2/2003 | Smith et al. | |
| 2003/0041198 A1 | 2/2003 | Exton et al. | |
| 2003/0285759 | 2/2003 | Kulkarni et al. | |
| 2003/0043191 A1 | 3/2003 | Tinsley et al. | |
| 2003/0046266 A1 | 3/2003 | Mullins et al. | |
| 2003/0046591 A1 | 3/2003 | Asghari-Kamrani et al. | |
| 2003/0051063 A1 | 3/2003 | Skufca et al. | |
| 2003/0055878 A1* | 3/2003 | Fletcher et al. | 709/203 |
| 2003/0065827 A1 | 4/2003 | Skufca et al. | |
| 2003/0069975 A1 | 4/2003 | Abjanic et al. | |
| 2003/0074467 A1 | 4/2003 | Oblak et al. | |
| 2003/0093402 A1 | 5/2003 | Upton | |
| 2003/0093470 A1 | 5/2003 | Upton | |
| 2003/0093471 A1 | 5/2003 | Upton | |
| 2003/0093575 A1 | 5/2003 | Upton | |
| 2003/0097345 A1 | 5/2003 | Upton | |
| 2003/0097574 A1 | 5/2003 | Upton | |
| 2003/0105884 A1 | 6/2003 | Upton | |
| 2003/0110117 A1 | 6/2003 | Saidenberg et al. | |
| 2003/0110315 A1 | 6/2003 | Upton | |
| 2003/0126136 A1 | 7/2003 | Omoigui | |
| 2003/0145047 A1 | 7/2003 | Upton | |
| 2003/0149791 A1 | 8/2003 | Kane et al. | |
| 2003/0167358 A1 | 9/2003 | Marvin et al. | |
| 2003/0182452 A1 | 9/2003 | Upton | |
| 2003/0233631 A1 | 12/2003 | Curry | |
| 2004/0068568 A1 | 4/2004 | Griffin | |
| 2004/0078373 A1 | 4/2004 | Ghoneimy et al. | |
| 2004/0133660 A1 | 7/2004 | Junghuber et al. | |
| 2004/0148336 A1 | 7/2004 | Hubbard et al. | |
| 2004/0204976 A1 | 10/2004 | Oyama et al. | |
| 2004/0225995 A1 | 11/2004 | Marvin et al. | |
| 2005/0223392 A1 | 10/2005 | Cox et al. | |
| 2006/0085797 A1 | 4/2006 | Connelly | |
| 2006/0234678 A1 | 10/2006 | Juitt et al. | |
| 2007/0038500 A1 | 2/2007 | Hammitt et al. | |

FOREIGN PATENT DOCUMENTS

| | | |
|---|---|---|
| EP | 1 061 455 A2 | 12/2000 |
| WO | 99/23558 | 5/1999 |
| WO | 00/29924 | 5/2000 |
| WO | 01/90884 A2 | 11/2001 |

OTHER PUBLICATIONS

Alonso, G., et al., "Advanced Transaction Models in Workflow Contexts," Proceedings of the 12*th* International Conference on Data Engineering, 14 pages (Feb. 1996).

Microsoft, "Microsoft.net Framework," Microsoft Corporation, pp. 1-50 (2000).

Plaindoux, Didier, "XML Transducers in Java," The Eleventh International World Wide Web Conference, 6 pages (May 2002).

Sun Microsystems, "J2EE Connector Architecture 1.0," (Aug. 2001).

Supplementary European Search Report for EP 02 78 4131 dated Aug. 8, 2007, 3 pages.

Van der Aaslst, W.M.P., et al., "XML Based Schema Definition for Support on the Inter-Organizational Workflow," University of Colorado and University of Eindhoven report, 39 pages (2000).

Willink, Edward D., "Meta Compilation for C++," University of Surrey, p. 362 (Jan. 2000).

Altova, "XML-to-XML Mapping," Altova, pp. 1-6 (2007).

BEA, "Transforming Data Using the XQuery Mapper," BEA AquaLogic Service Bus 2.0 Documentation, pp. 1-19 (2006).

Bogunovic, Nikola, "A Programming Model for Composing Data Flow Collaborative Applications," IEEE, 7 pages (Mar. 1999).

Smith, Milton et al., "Marching Towards a Software Reuse Future," ACM Ada Letters, vol. XIV, No. 6, pp. 62-72, (Nov./Dec. 1994).

Jamper, "Jamper-Jave XML Mapper," pp. 1-4 (2007).

Stylus Studio, XQuery Mapper Stylus Studios, pp. 1-6 (2007).

Sung, S. Y., et al., "A Multimedia Authoring Tool for the Internet," IEEE, pp. 304-308, (1997).

Sun Microsystems, "Java Message Service Version 1.0.2b," Aug. 27, 2001, 118 pages.

XAResource (Java™ 2 Platform EE v.1.4), "Interface XA Resource," Dec. 12, 2002, 9 pages.

FOLDOC, :Java Message Service Definition of JMS, http//foldoc.org/?JMS,:Jun. 22, 2001, 1 page.

Newcomer, Eric, "Understanding Web Services: XML, WSDL, SOAP, and UDDI," May 2002, 353 pages.

Hewlett-Packard, *HP Application Server*, Technical Guide Version 8.0, HP, Nov. 15, 2001, pp. 1-234.

Sun Microsystems, *IPlanet Application Server 6.0 White Paper*, iPlanet E-Commerce Solutions, May 25, 2000, pp. 1-104.

Enrique Duvos & Azer Bestavros, *An Infrastructure for the Dynamic Distribution of Web Application and Services*, Department of Computer Science Boston University, Dec. 2000, pp. 1-22.

Ed Roman & Rickard Öberg, *The Technical Benefits of EJB and J2EE Technologies over COM+ and Windows DNA*, Enterprise Edition (J2EE) Technologies, Dec. 1999, pp. 1-24.

Marcello Mariucci, *Enterprise Application Server Development Environments*, Overview, University of Stuttgart, Oct. 10, 2000, pp. 1-30.

Blake, "Rule-Driven Coordination Agents: A Self-Configurable Agent Architecture for Distributed Control", IEEE, Mar. 2001, pp. 271-277.

Dahalin et al., "*Workflow Interoperability Using Extensible Markup Language (XML)*", IEEE, Jul. 2002 pp. 513-516.

Kunisetty, "*Workflow Modeling and Simulation Using an Extensible Object-Oriented Knowledge Base Management System*", CiteSeer, 1996, pp.1-60.

Van Der Aaslt et al., "*Verification of XRL: An XLM-Based Workflow Language*", IEEE, Jul. 2001, pp. 427-432.

Paul, Laura Gibbone, "RosettaNet: Teaching business to work together", Oct. 1, 1999. http://www.developer.com/xml/article.php/616641.

U.S. Appl. No. 10/271,047, filed Oct. 15, 2002, Upton.
U.S. Appl. No. 10/271,156, filed Oct. 15, 2002, Upton.
U.S. Appl. No. 10/271,162, filed Oct. 15, 2002, Upton.
U.S. Appl. No. 10/271,194, filed Oct. 15, 2002, Upton.
U.S. Appl. No. 10/271,215, filed Oct. 15, 2002, Upton.
U.S. Appl. No. 10/271,244, filed Oct. 15, 2002, Upton.
U.S. Appl. No. 10/271,402, filed Oct. 15, 2002, Upton.
U.S. Appl. No. 10/271,410, filed Oct. 15, 2002, Upton.
U.S. Appl. No. 10/271,414, filed Oct. 15, 2002, Upton.
U.S. Appl. No. 10/271,423, filed Oct. 15, 2002, Upton.

C. Moran et al., "*ARIES: A Transaction Recovery Method Supporting Fine-Granularity Locking and Partial Rollbacks Using Write-Ahead Logging*", ACM Transaction on Database Systems, vol. 17, No. 1, Mar. 1992, pp. 94-162.

Marcello Mariucci, *Enterprise Application Server Development Environments*, University of Stuttgart, Oct. 10, 2000, pp. 1-30.

Chen, Jeff, et al., "eCo Architecture for Electronic Commerce Interoperability," Jun. 29, 1999, CommerceNet, Inc., 107 pages.

Embury, Suzanne M., et al. "Assisting the Comprehension of Legacy Transactions," Proceedings Eighth Working Conference on Reverse Engineering, IEEE, Oct. 2-5, 2001, pp. 345-354.

Java™ Debug Interface, definition, retrieved from <URL http: java.sun.com/j2se/1.4.2/docs/guide/jpda/jdi/overview-summary.html on Feb. 21, 2002, 3 pages.

Kilgore, Richard A., "Multi-Language Open-Source Modeling Using the Microsoft.net Architecture," Proceedings of the 2002 Winter Simulation Conference, IEEE, pp. 629-633 (2002).

Mays, Eric, et al., "A Persistant Store for Large Shared Knowledge Bases," IEEE Transactions on Knowledge and Data Engineering, vol. 3, Issue 1, pp. 33-41 (Mar. 1991).

Sosnoski, Dennis, "XML and Java Technologies: Data Binding Part 1: Code Generation Approaches—JAXB and More, " IBM, pp. 1-11 (Jan. 2003).

Tang, Chunqiang, et al., "Integrating Remote Invocation and Distributed Shared State," Proceedings of the 18$^{th}$ International Parallel and Distributed Processing Symposium (IPDPS'04), Apr. 26-30, 2004, 10 pages.

"Introducing Microsoft DotNet"; by ChristopheLauer, Jul. 2, 2002; http://web.archive.org/web/20020702162429/http://www.freevbcode.com/ShowCode.asp?ID=2171; pp. 1-10.

HP "HP Application Server, Developer's Guide, Version 8.0," Hewlett-Packard Company, Palo Alto, CA, pp. 27-81, 127, 160, and 195-271 (1999-2001).

Erich Liebmann et al., "Adaptive Data Dissemination and Caching for Edge Service Architectures Built with the J2EE", Mar. 2004, ACM Press, 2004 ACM Symposium on Applied Computing, pp. 1717-1724.

\* cited by examiner

SYSTEM AND METHOD FOR IMPLEMENTING AN EVENT ADAPTER

CLAIM OF PRIORITY

This application claims priority to U.S. Provisional Patent Application No. 60/347,919, filed Oct. 18, 2001, entitled "APPLICATION VIEW," as well as Application No. 60/347,901, filed Oct. 18, 2001, entitled "EVENT ADAPTER," each of which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. patent application Ser. No. 10/271,194 entitled "APPLICATION VIEW COMPONENT FOR SYSTEM INTEGRATION," by Mitch Upton, filed Oct. 15, 2002, issued as U.S. Pat. No. 7,080,092 on Jul. 18, 2006.

U.S. patent application Ser. No. 10/271,162 entitled "SYSTEM AND METHOD FOR PROVIDING A JAVA INTERFACE TO AN APPLICATION VIEW COMPONENT," by Mitch Upton, filed Oct. 15, 2002, pending.

U.S. patent application Ser. No. 10/271,244 entitled "SYSTEM AND METHOD FOR INVOKING BUSINESS FUNCTIONALITY FOR A WORKFLOW," by Mitch Upton, filed Oct. 15, 2002, pending.

U.S. patent application Ser. No. 10/271,414 entitled "SYSTEM AND METHOD FOR USING WEB SERVICES WITH AN ENTERPRISE SYSTEM," by Mitch Upton, filed Oct. 15, 2002, issued as U.S. Pat. No. 7,340,714 on Mar. 4, 2008.

U.S. patent application Ser. No. 10/271,156 entitled "SYSTEM AND METHOD USING A CONNECTOR ARCHITECTURE FOR APPLICATION INTEGRATION," by Mitch Upton, filed Oct. 15, 2002, pending.

U.S. patent application Ser. No. 10/271,047 entitled "SYSTEM AND METHOD FOR IMPLEMENTING A SCHEMA OBJECT MODEL IN APPLICATION INTEGRATION," by Mitch Upton, filed Oct. 15, 2002, pending.

U.S. patent application Ser. No. 10/271,402 entitled "SYSTEM AND METHOD UTILIZING AN INTERFACE COMPONENT TO QUERY A DOCUMENT," by Mitch Upton, filed Oct. 15, 2002, issued as U.S. Pat. No. 7,152,204 on Dec. 19, 2006.

U.S. patent application Ser. No. 10/271,423 entitled "SYSTEM AND METHOD USING ASYNCHRONOUS MESSAGING FOR APPLICATION INTEGRATION," by Mitch Upton, filed Oct. 15, 2002, pending.

U.S. patent application Ser. No. 10/271,215 entitled "SYSTEMS AND METHODS FOR INTEGRATION ADAPTER SECURITY," by Mitch Upton, filed Oct. 15, 2002, pending.

U.S. patent application Ser. No. 10/271,410 entitled "SYSTEM AND METHOD FOR IMPLEMENTING A SERVICE ADAPTER," by Mitch Upton, filed Oct. 15, 2002, pending.

FIELD OF THE INVENTION

The invention relates generally to components useful for integrating applications.

BACKGROUND

E-commerce has become a major driving factor in the new economy. To be successful in the long-term, e-commerce will require many companies to engage in cross-enterprise collaborations. To achieve cross-enterprise integration, a company must first integrate its internal applications. Using existing technology and tools, application integration can be an expensive proposition. No integration solution exists that is easy to use, affordable, and based on industry standards. Neither does a solution exist that is based on an industry standard infrastructure, has universal connectivity, is capable of massive scalability, and has accessible business process tools.

Application integration to this point has been very inward-focused. Many existing integration systems have not focused on integrating applications between enterprises. Even when integration solutions were used for cross-enterprise integration, the solutions were still narrowly focused and aimed at vertical markets. This inward focus did little to help companies field external business-to-consumer and business-to-business applications, such as applications that can utilize the Internet to generate revenue and reduce costs. The requirement for Internet-enabled applications led to the rise of the application server market. To date, application servers have primarily been used to host external applications targeted at customers and partners. Application servers are themselves packaged applications that, instead of solving a specific problem, are general-purpose platforms that host vertical solutions.

The first attempts at application integration were primarily focused on low-level implementation details such as the format of the data, the byte ordering between machines, and character encoding. The focus on low-level data formats was necessary because, for the first generation of application integration solutions, there were no widely adopted standards for data encoding that could be deployed across multiple vertical applications.

The traditional approach involved connecting individual systems to, in effect, hardwire the systems together. This approach can be complex, as connecting different systems can require an intimate, low-level knowledge of the proprietary technologies of multiple systems.

Present integration systems, which have moved away from "hardwiring" systems together, still suffer from a lack of standards. Each integration vendor typically provides a proprietary solution for application integration, message transformation, message formats, message transport, and routing. Not one of these systems to date has achieved significant market share to enable its technologies to become the de-facto standard. This lack of standards has given packaged application vendors little incentive to integrate these systems with their applications. Further, each of these integration systems or servers has its own proprietary API, such that packaged application vendors cannot leverage development beyond a single integration server. This fragmentation of the integration market has provided little financial incentive for third parties.

BRIEF SUMMARY

In integration systems and methods, events can be extracted from a resource such as an application or enterprise system. In one such system and method, an application view component is used to provide an interface to an enterprise system for a client application. An event adapter allows the enterprise system to initiate communication with the client application by triggering an event in the enterprise system. When the application view component is notified of the event, the application view component can extract data about the event from the enterprise system through the event adapter and propagate the data to a client application. It is also possible for the client application to request an event using the application view component. The event adapter can extract data about the event from the enterprise system, create an object such as an XML-based object containing the data, and notify the application view component. The application view component can pass the event to the client application.

Other features, aspects, and objects of the invention can be obtained from a review of the specification, the figures, and the claims.

DETAILED DESCRIPTION

Application integration components can be used to integrate a variety of applications and systems, such as Enterprise Information Systems (EISs). Information technology (IT) organizations typically utilize several highly-specialized applications. Without a common integration platform to facilitate application-level integration, these applications cannot be integrated without extensive, highly-specialized development efforts.

Application integration can utilize adapters to establish an enterprise-wide, united framework for integrating any current or future application. Adapters can simplify integration efforts by allowing each application to be integrated with an application server, instead of requiring that each application being integrated with every other application.

The development and widespread acceptance of standards such as the Java 2 Platform, Enterprise Edition (J2EE) from Sun Microsystems, Inc. of Santa Clara, Calif., as well as the eXtensible Markup Language (XML), has laid the groundwork for a standardized approach to the development of these adapters. Perhaps the most significant of these standards for application integration is the J2EE Connector architecture. The J2EE Connector architecture provides a standardized approach for the development of adapters for all types of applications, from legacy mainframe applications, such as CICS from IBM, to packaged applications such as PeopleSoft, Siebel, and SAP. The adoption of such standards enables businesses to develop adapters that work on any J2EE-compliant application server, for example.

Integration Architecture

Application integration can build on this standardized approach in an application integration framework by providing a standards-based architecture for hosting J2EE Connector architecture-based adapters. Developers can build J2EE Connector architecture-compliant adapters and deploy these adapters, in the integration framework, to connect enterprise applications to an application server.

These adapters can be used to define business-focused interfaces to an EIS, the interfaces referred to herein as "application views" of the respective adapters. An application view can provide a simple, self-describing, consistent interface to services and events in an application. Application views can make use of an adapter for an EIS, making it possible to expose existing information systems as business services. Unlike adapters, however, an application view does not require users to have intimate knowledge of the EIS or the client interface for that EIS, such that non-programmers or technical analysts can use application views. An application view can provide a business-oriented way for business analysts to access enterprise data without worrying about the programmatic details defined in an adapter. These same users may be otherwise unable to use an adapter directly, due to a lack of familiarity with the EIS.

An application integration component directed at enterprise application integration can have several primary aspects. If the functionality of an EIS such as a PeopleSoft system or an SAP system is to be invoked, an implementation of the J2EE Connector Architecture can be used. If something occurs inside an EIS system, such as a trigger going off, an event can be generated. This event may, in some embodiments, need to be communicated to an external application. An event architecture in an application integration component can handle this communication.

Application Views

An application view can provide significant value to an application integration component. An application view can abstract away much of the complexity in dealing with an application, such as a backend EIS system. Application views can also simplify the way in which adapters are accessed. Application views can provide a layer of abstraction, for example, between an adapter and the EIS functions exposed by that adapter. Instead of accessing an EIS by direct programming a user can simply: edit an adapter's application views, create new application views, or delete any obsolete application view(s). A layer of abstraction formed by application views can help non-programmers maintain the services and events exposed by an adapter. Each application view can be specific to a single adapter, and can define a set of business functions on that adapter's EIS. After an adapter is created, a Web-based interface for the adapter can be used to define application views.

If an application view is used as a primary user interface for an adapter, a number of features can be included that are not commonly found in existing enterprise application integration technologies. Application views can, for example, use XML as a common language among applications. Service and event definitions can be used to expose application capabilities. XML schemas can be used to define the data for services and events. Bidirectional communication can also be supported in adapters.

An application view can be an integral part of an integration framework when used as an interface object. An application view can provide a view of the application capabilities exposed by an adapter that a user can customize to meet specific needs. A user can tailor an application view, for example, for a specific business purpose. As a result, the application view can provide an effective alternative to the "one size fits all" approach that many applications provide for the design of a client interface. An application view can be defined for only the business or other capabilities that are applicable for a specific purpose. The capabilities can be customized such as by naming, describing, and defining the data requirements.

Figure 1:
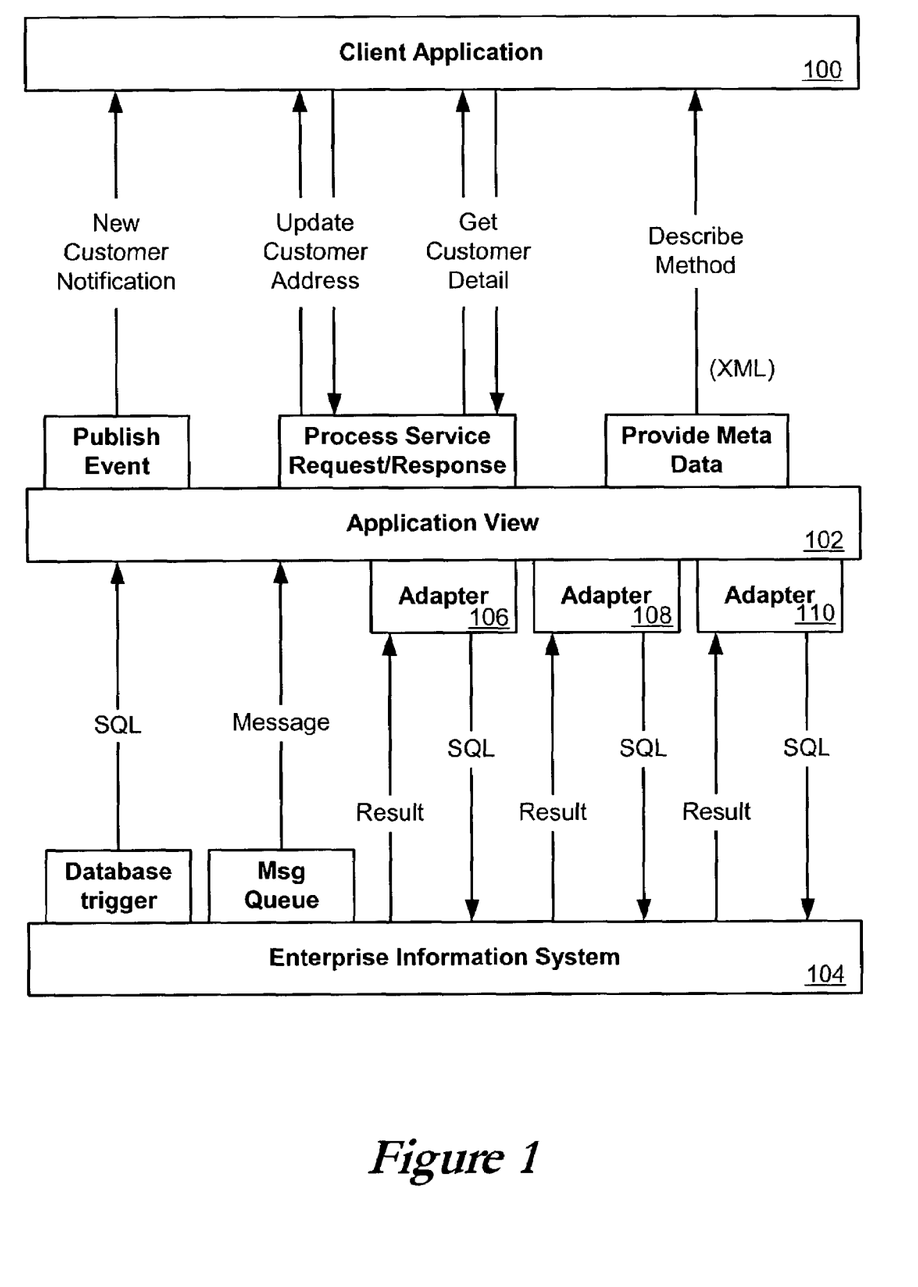
FIG. 1 is a diagram of a system that can be used in accordance with one embodiment of the present invention.

In one example, shown in FIG. 1, adapters 106, 108, 110 can be developed that allow a client application 100 to communicate with an Enterprise Information System 104 through the use of an application view 102. A developer can begin by coding an adapter that exposes the functionality in the enterprise application that accesses enterprise data. The functionality the adapter exposes could, for example, update records in a database using SQL statements, or could request information from an SAP system using its BAPI or IDOC interfaces. A business analyst, working with the developer, can then define an application view of the adapter using an application view interface.

An application view is an object, which can be implemented in one embodiment as a stateless session JavaBean. There can be a Java interface to the application view for the client application. A Java application can be custom coded to use that object, such as by passing XML in and receiving XML back. In addition, a business process manager component can be included that allows process engineers to define workflows, and allows application views to be invoked as business services. In a workflow, a callout can be made to an EIS to get information such as a customer's credit record. The fact that the application view is a Java object or enterprise JavaBean can be hidden from the process and designer.

In application integration, new application views can be hot-deployed against an existing EIS through a web-based interface. An application view is hot-deployed when it is deployed with the system running, without restarting the destination server. A new customer management tool for SAP, for example, can also be defined through a web browser. A user can also decide whether or not an application view should be deployed persistently. Persistent deployment means the application view can be redeployed whenever the application server is restarted.

Integration Framework

Application integration can utilize an integration framework, which can provide a systematic, standards-based architecture for hosting application views. Features of such a framework can include application views for exposing application functions and design-time graphical user interfaces (GUIs), such as web-based interfaces that can be used for creating application views. The integration framework utilizes adapters, instead of "hardwiring" enterprise systems together. Once an adapter is deployed for an EIS, other components and applications can use that adapter to access data on the EIS.

A framework in accordance with one embodiment of the present invention relies on XML as the standard format for messages. XML includes XSLT, a standard for transforming XML documents into other XML documents. XSLT is designed for use as part of XSL, which is a stylesheet language for XML. In XSLT, an XML document is used to specify the operations to perform on a class of XML documents in order to transform the documents' structure and content. An XSLT transformation can make use of any of the operations built into the Java programming language, or can make use of custom operations written either in Java or in native code. An integration framework allows a business process to invoke an XSLT engine in order to transform XML messages.

An integration framework can also rely on standards for transporting messages such as Java Message Service (JMS) and HTTPS. JMS is a standard API for interfacing with message transport systems. Using JMS, a framework can utilize any message transport mechanism that provides a JMS interface. The J2EE Connector architecture standard does not specify a message transport mechanism, but an application integration framework can specify such a transport mechanism.

An integration framework can be based on an existing standard infrastructure, such as an application server that supports J2EE, JMS, and the J2EE Connector architecture. Using such a standard infrastructure also provides for high availability and scalability, such as by clustering and resource pooling. The framework can provide for universal connectivity by enabling the construction of XML-based application adapters that can connect to any legacy and packaged application. An adapter development kit can be used to allow users such as customers, system integrators, and packaged application vendors to quickly develop J2EE connector architecture-compliant and integration framework-based adapters. The framework can utilize XML, which means that the same data format can be used for both within- and between-enterprise integration, since many e-commerce systems use XML as the standard message format.

An integration framework can also utilize a business-process engine to allow non-programmers to graphically construct and maintain business processes. An integration framework can implement a common model on top of the J2EE Connector architecture that is focused on business-level concepts. This model, which can consist of XML-encoded events and services, allows the management of a consistent integration environment, regardless of the interface required between adapters and their target applications. The business processes can react to events generated by applications, and they can invoke an application's functionality via services that are exposed by an application adapter.

Events and Services

An application view can support events and services for an application through an underlying adapter. These events and services can be established for a particular use, such as for a particular business process. In one example, an "event" enables messages generated by an application to be managed following a publish/subscribe model. In this model, users can "subscribe" to receive messages that are "published" by an application. Each message can be referred to as a publication event. Such a model can be implemented through multicasting, for example.

A "service" can act as a business function that can be invoked by a user. Service invocations can cause messages to be sent to an application following a request/response model. This model can differ from a publish/subscribe model, in that messages are only sent when requested by a user. This can be implemented, for example, using a point-to-point messaging system. Both events and services can be passed through the system as XML documents.

A service can constitute business logic within an application that an application view exposes for reuse. When an application view receives an XML document containing a request to invoke a business service, the application view can invoke that functionality within its target application and return an XML document that describes the result. Each service on an application view can represent a single function, such as a single, logical business function, within a target application. A service can take request data, such as in the form of an XML document, and return response data, which can also take the form of an XML document. Services can represent bi-directional communication between an application view client and a target application. Services can allow for synchronous or asynchronous communication between applications.

An "event" can be, for example, an XML document that is published by an application view when something of interest occurs within an application. Events can allow for asynchronous messaging between applications. Clients or users that wish to be notified of the occurrence of events can register their interest with an application view, such as by "subscribing" to the application view. The application view can act as a broker between the target application and the client. Once a client has subscribed to events published by an application view, the application view can notify the client whenever an event of interest occurs within the target application. When an event subscriber is notified that an event of interest has occurred, the client can be passed an XML document that describes the event. Application views that publish events can provide the clients or users with the XML schemas that describe publishable events. A customer manager tool can be used to make requests into an EIS. A customer manager tool can also publish events to other applications based on events that occur in the EIS.

Adapter Development Kit (ADK)

An adapter development kit (ADK) can be used to facilitate the construction of adapters that will run, for example, in any J2EE-compliant environment. These adapters can have additional, value-added functionality when hosted within an integration framework component. An ADK can provide tools to allow adapter developers to create bi-directional adapters that support the business-level concepts of events and services. An adapter developed using the ADK can provide access to an application's metadata, which can be used to define events and services via the application view. The ADK can provide run-time support for events and services. The ADK can also provide support for constructing thin, JSP-based user interfaces for use in defining application views based on the adapter.

An ADK can provide a collection of frameworks to support the development, packaging, and distribution of adapters, such as a design-time framework, a run-time framework, a logging/auditing framework, and a packaging framework. A design-time framework can provide a tool set to support the development of a user interface for an adapter. The user interface can be used for defining and deploying application views. This can be a powerful feature, as it can make the adapter capabilities easier to use, giving the adapter a wider audience.

An ADK run-time framework can provide a complete, extensible event generator to support the development of event adapters. To support the development of service adapters, the runtime framework can provide a complete, but minimally functional J2EE-compliant adapter. Adapter developers can save time coding and debugging by starting with and extending this base framework.

An ADK packaging framework can also be utilized that provides a tool set for packaging an adapter for delivery to a customer. This framework can make the creation of various archive and environment files easy for adapter developers.

Logging

One feature of an adapter that can be essential for certain applications is logging. When an adapter encounters an error or warning condition, the adapter may not be able to stop processing and wait for an end-user to respond. The adapter can therefore provide an accurate audit log for tracking errors. An ADK can include a logging framework that gives adapter developers the ability to log internationalized and localized messages to multiple output destinations.

Event Router

An application programming interface (API) can be used to interact with XML documents, such as to set basic data on an XML document. If a new customer is in an EIS system, there can be information related to that customer such as the customer's name and address. An event generator can do a "post" event, which posts the event to an event router. The event router can transfer the event from an event generator to an application integration server so the application integration server can notify listeners registered for that event. The event router can know how to communicate with the application integration server.

An event router and server can sit on a different server than the main server or application server. This may be a common scenario, as something tightly coupled to an SAP system may be kept close to the SAP system instead of on the main server.

An event router can publish an event message over to the application integration server with a "publish" call of "event message." This can then be published to the application view topic. Once the topic receives the event, it can notify the registered event listener of the client. This can all be based, at least in part, on JMS/XML standards.

Siebel Example

Figure 2:
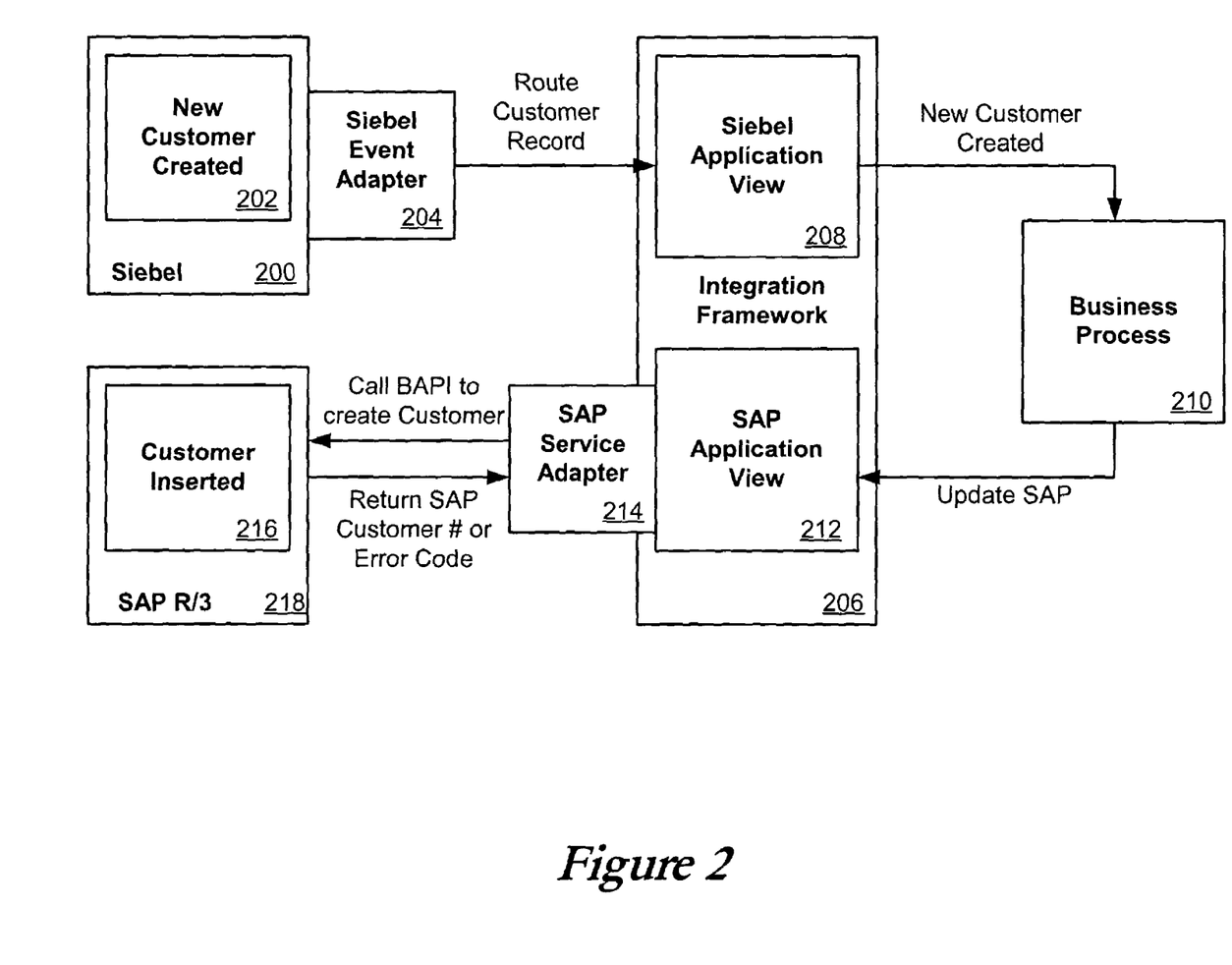
FIG. 2 is an example of a system that can be used in accordance with another embodiment of the present invention.

The example of FIG. 2 shows the interrelation of some of the features described above, in this case integrating a Siebel system 200 with an SAP system 218. This example deals with a situation that could arise involving the need to add a new customer to an SAP system 218 that was created originally created in Siebel 200. In this example, a new customer 202 is created in Siebel 200. Through SiebelCode, a Siebel event adapter 204 is notified and passed the information for the new customer. The Siebel event adapter 204 creates an XML-based object containing the customer information and notifies the Siebel application view 208 of the event. The Siebel application view 208, which in this example is part of an integration framework 206, passes the event to the approprite business process 210. The business process 210 determines that the customer information needs to be replicated to an SAP system 218. The business process 210 transforms the Siebel XML representation of the customer to an SAP XML representation. The business process then invokes a service provided by the SAP application view 212. The SAP application view 212, in turn, calls the SAP service adapter 214 and passes the XML message, which is now in a format that the SAP adapter can understand. The SAP adapter 214 converts the XML message to a specific BAPI (business application programming interface) and calls the SAP system 218. SAP 218 processes the request, thereby inserting the new customer 216, and returns the customer number assigned by SAP 218.

Business Example

In an example of an application view useful for exposing a business interface to an application, a new application view object can be created with a name that reflects its business purpose and within a namespace that describes its place within the organizational structure of the business. The resulting application view can satisfy the business data requirements and can perform the proper interaction with applications. Users of the application view can include business analysts, technical analysts, and subject matter experts. A business analyst can decide what the business purpose of the application view will be. The technical analyst can decide which application is best suited to the purpose for the application view. The technical analyst can enlist the help of the subject matter (application) expert to assist in defining the application view by offering application expertise, and possibly modifying the application or its metadata to meet the needs of the application view. The adapter for the application selected by the technical analyst should already be installed and the appropriate JSP-based design-time GUI installed. The server hosting the adapter and the design-time interface should also be up and running before creating a new application view.

The basic flow and alternate flows for the application view can assume that the business analyst, technical analyst, and subject matter expert are all interacting during the creation/definition of the application view. This can be unlikely. In the case that each user is taking a turn reviewing the current state of the application view, the flow of events would take the form of multiple passes through the flow of events, with each pass representing only the single user interactions.

In a basic flow, a technical analyst opens a web browser and points to the URL for the adapter design-time interface. The technical analyst and business analyst decide which business organization the application view belongs under, and verifies that an appropriate application view namespace exists. This can be done using the namespace browser tree on the home page of the adapter design-time interface. If no appropriate namespace exists, it can be created using the namespace browser.

The technical analyst and business analyst agree on the name for the application view. The name can reflect the business purpose for the application view. The technical analyst can create a new application view within the identified namespace and give it the agreed-upon name. The business analyst gives a brief description of the application view's business purpose and the technical analyst types it into the description field of the new application view. The set of events and services for the application view are reviewed and edited, if necessary. The technical analyst can then save the new application view. At this point, the application view can be saved for later use, tested, or deployed into the runtime application view engine.

Adapters

As discussed above, adapters can be developed as service or event adapters. A service adapter can invoke a specific function in the resource to which it is connected. An event adapter can propagate information from the resource to the integration environment. For each application view, businesses can add any number of services and events to an application view definition to support specific types of transactions between an application server and, for example, a target enterprise system. Because an adapter can use XML to translate an application's data format, business analysts do not need to understand the format. If a business analyst wants to use an adapter, it is only necessary to know how to define and use application views. Best of all, because all adapters can use a similar Web-based interface for defining application views, it can be easy to learn to use current and future adapters. XML can make application integration smooth both for developers and business analysts.

The J2EE specification does not currently provide guidelines for an EIS to initiate communication with the application server or client. Application integration can provide this capability through the user of event adapters. Another important feature of an application view is the ability to support bi-directional communication. The J2EE specification does not currently provide guidelines for an EIS to initiate communication with the application server or client. This capability can be provided by an event adapter. When added to an application view, each event responds to a particular enterprise application state. When a particular event is triggered, the application view can extract data about the event from the enterprise system and propagate the data in an XML document to the integration environment.

Similarly, when added to an application view, each service can represent a particular function in an enterprise system. When an application view receives an XML document that maps to a particular server, it invokes the corresponding function in the enterprise system using the service adapter. The enterprise system can in some embodiments send a response to the service.

Event Adapters

Event adapters can be designed to propagate information between resources or applications, such as from an EIS into an application server. These adapters can be described as publishers of information. There are, in one embodiment, two basic types of event adapters: in-process adapters and out-of-process adapters. In-process event adapters can execute within the same process as the EIS. Out-of-process adapters can execute in a separate process. In-process and out-of-process event adapters only differ in how they accomplish the data extraction process.

Event adapters running in an application integration environment can perform at least three functions. First, an event adapter can respond to events deemed to be of interest to some external party that occur inside the running EIS, and can extract data about the event from the EIS into the adapter. An event adapter can transform event data from an El S-specific format to an XML document that conforms to the XML schema for the event. The XML schema can be based on metadata in the EIS. An event adapter can also propagate the event to an event context obtained from the application view.

An ADK can implement aspects of these three functions that are generic across all event adapters. Consequently, a user can focus on the EIS-specific aspects of an adapter. This concept is similar to the concept behind Enterprise Java Beans (EJB). With EJB, the container provides system-level services for EJB developers so they can focus on implementing business application logic.

These adapters may not contain application integration specifics, such that they can be plugged into any application server that supports the J2EE Connector Architecture specification. These adapters can be developed by making minor modifications to the procedures given for developing a service adapter.

Along with event and service adapters, an ADK design-time framework can provide the tools needed to build a Web-based GUI that adapter users need to define, deploy, and test their application views. Although each adapter can have EIS-specific functionality, all adapters can require a GUI for deploying application views. Such a framework can minimize the effort required to create and deploy these interfaces. This minimization can be accomplished, at least in part, using two primary components. One such component is a Web application component that allows a user to build an HTML-based GUI by using, for example, Java Server Pages (JSP). A Web application component can be augmented by tools such as JSP templates, a tag library, and the JavaScript library. A second such component is a deployment helper component, or request handler, that can provide a simple API for deploying, undeploying, and editing application views on an application server.

An application view can represent both events and services that support a business purpose. This can allow a business user to interact with the application view for all communication with an application. This bi-directional communication can be supported by an event adapter and a service adapter. An application view can abstract this fact from the user and present the user with a unified business interface to the application.

An ADK packaging framework can provide a tool set for packaging an adapter for delivery to a customer. Ideally, all adapters are installed, configured, and uninstalled the same on a single application server. Moreover, all service adapters can be J2EE compliant. The packaging framework can make creating a J2EE adapter archive (.rar) file, Web application archive (.war) file, the enterprise archive (.ear) file, and application integration design environment archive easy.

Adapter activity typically falls within one of two conceptual entities: run time and design time. Run time refers to functionality that occurs when adapters execute their processes. Design time refers to the adapter user's implementation of an application view. In essence, design time is the act of creating, deploying, and testing an application view.

Run time and design time can be characterized in an ADK by run-time and design-time frameworks. A run-time framework can be comprised of the tools used when developing adapters, while the design-time framework can refer to the tools used to design Web-based user interfaces.

A run-time framework is a set of tools that can be used to develop event and service adapters. To support event adapter development, the run-time framework can provide a basic, extensible event generator. For service adapter development, the run-time framework can provide a complete J2EE-compliant adapter.

Classes supplied by the run-time framework can provide several following benefits. One benefit of such a class is that it can allow a user to focus on EIS specifics rather than J2EE specifics. The classes can also minimize the effort needed to use the ADK logging framework, can simplify the complexity of J2EE Connector Architecture, and can minimize redundant code across adapters.

In addition, a run-time framework can provide abstract base classes to help implement an event generator to leverage the event support provided by an ADK environment. A key component of a run-time framework is a run-time engine, which can host the adapter component responsible for handling service invocations, and can manages physical connections to the EIS, login authentication, and transaction management, all in compliance with the J2EE Connector Architecture standard.

A design-time interface for each adapter in accordance with one embodiment of the present invention is a J2EE Web application that is bundled as a .war file. A Web application is a bundle of .jsp, .html, image files, and so on. The Web application descriptor is web.xml. The descriptor instructs the J2EE Web container how to deploy and initialize the Web application. Every Web application has a context. The context is specified during deployment and identifies resources associated with the Web application under the Web container's doc root.

An ADK can be used to create event adapters and service adapters. Within the ADK architecture, services and events can be defined as self-describing objects that use an XML schema to define their input and output.

An event can be an XML document that is published by an application view when an event of interest occurs within an EIS. Clients that want to be notified of events can register their interest with an application view. The application view acts as a broker between the target application and the client. When a client has subscribed to events published by an application view, the application view notifies the client whenever an event of interest occurs within the target application. When an event subscriber is notified that an event of interest has occurred, it is passed an XML document that describes the event. Application views that publish events can also provide clients with the XML schema for the publishable events. An application view represents a business-level interface to specific functionality in an application.

Each adapter created can have an adapter logical name, a unique identifier that represents an individual adapter and serves as the organizing principle for all adapters. As such, the adapter logical name can be used to identify an individual adapter and can be used to name a message bundle, a logging configuration, and log categories. An adapter logical name can be, for example, a combination of the vendor name, the type of EIS connected to the adapter, and the version number of the EIS. By convention, this information can be expressed as VENDOR_EIS-TYPE_EIS version.

An adapter logical name can be used with adapters in a number of ways. One way is to use it as a convention, although this is not required. Another way is to use it during adapter deployment as part of the .war, .rar, .jar, and ear filenames. It can also be used as an organizing principle, or as a return value to an abstract method such as getAdapterLogicalName( ).

The Name attribute of a <ConnectorComponent> element can be an adapter logical name. This can be a key that is used by application integration to associate application views to a deployed resource adapter, as shown for the sample adapter:

<ConnectorComponent
        Name="BEA_WLS_SAMPLE_ADK"
        Targets="myserver"
        URI="BEA_WLS_SAMPLE_ADK.rar"/>

The adapter logical name can be used as the name of the .rar file as a convention, but is not required in the URI attribute.

Developing an Event Adapter

Figure 3:
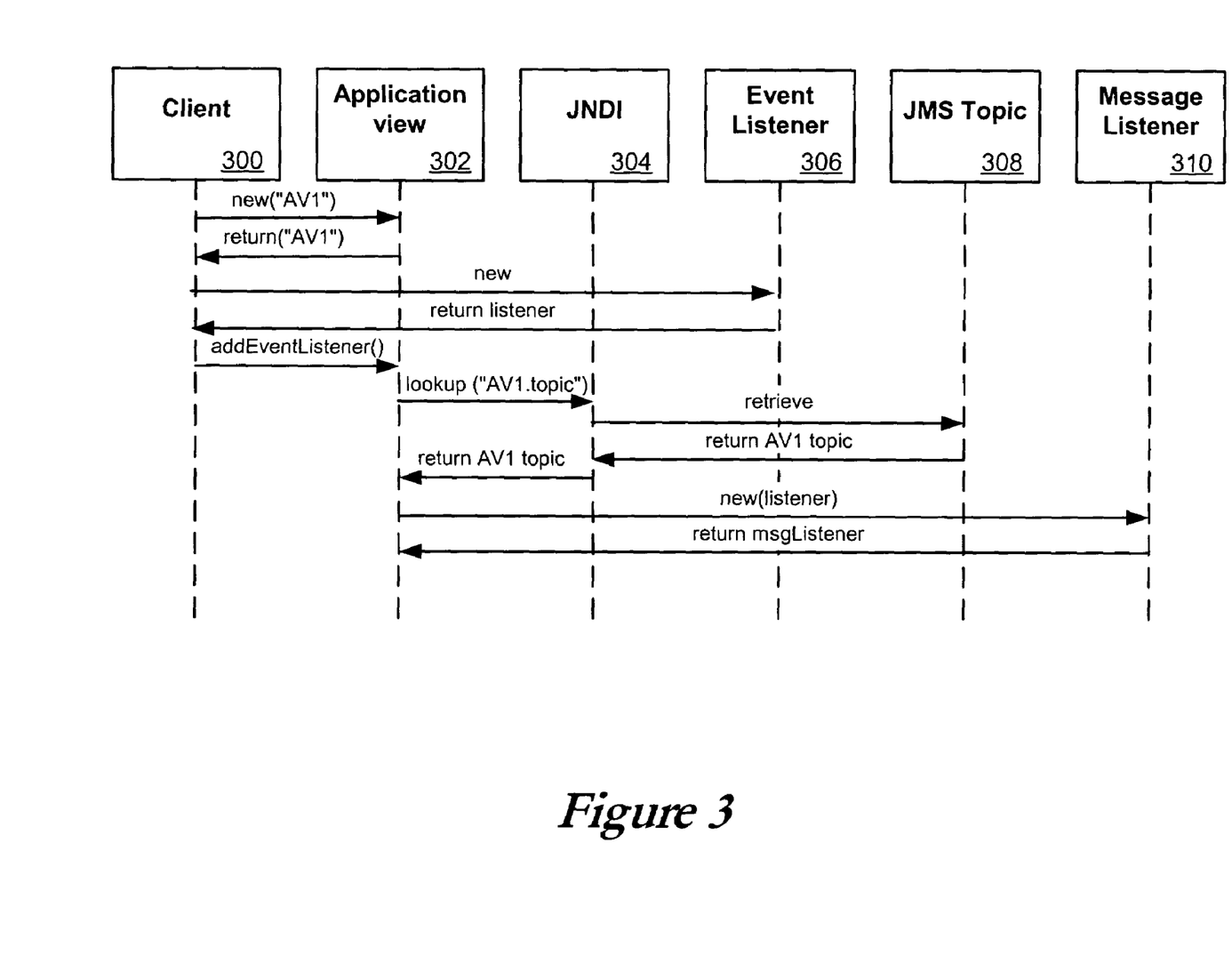
FIGS. 3 and 4 are state diagrams showing a method that can be used with the systems of FIGS. 1 and 2.
Figure 4:
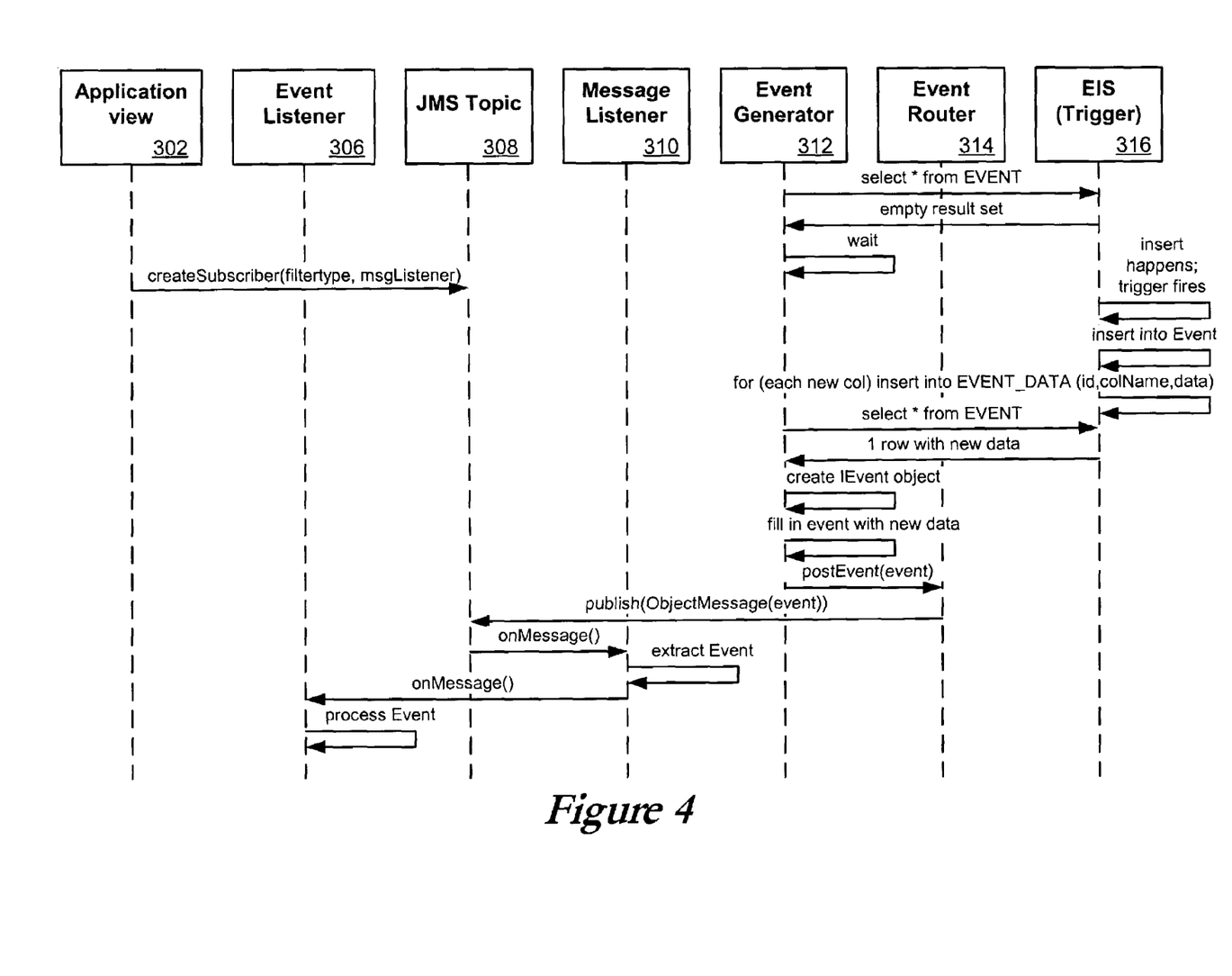

The behavior of an Event in the run-time environment is depicted in the example of FIGS. 3 and 4. A client 300 can request a new application view 302 instance. The client 300 also requests a new event listener 306, which can be used to listen on a JMS Topic 308. The application view 302 can do a lookup for the JMS topic 308 using JNDI 304. The application view 302 can also request a new message listener 310. An event generator 312 can be used to get data from an EIS 316. An event router 314 can be used to route the event to the appropriate JMS Topic 308.

When developing an event adapter, a first step can involve development considerations, such as when event types and extraction mechanisms will be used/supported. The user can also determine what comprises each event. The user can determine what the contents of the event will be, how it will be defined in the XML schema, and what will trigger the event.

Next, the user can decide which method of data extraction will be used. Extraction can be done by a "Push," wherein the EIS notifies the adapter of an event. Extraction can also be done using a "Pull," where the adapter can poll the EIS and pull event data from the EIS. A user can use a pull method, for example, when the adapter needs to poll the EIS to determine a change-of-state. A push event can be used, for example, when a user wants to implement an event generation that works more like a publish/subscribe model.

In order to prepare a computer for adapter development, the user can set up a file structure necessary to build an event adapter, which can be the same as that set up for service adapters. The user can assign an adapter logical name. By convention, this name can be comprised of the vendor name, the type of EIS connected to the adapter, and the version number of the EIS, for example, and can be expressed as vendor_EIS-type_EIS version. Application integration can employ a build process based upon Ant, a 100% pure Java-based build tool.

A build.xml file can be used, which can be an Ant build file containing the tasks needed to build a J2EE-compliant adapter. Running a GenerateAdapterTemplate or similar utility to clone a development tree for an adapter creates a build-.xml file specifically for that adapter. This will free the user from having to customize build.xml and will ensure that the code is correct.

Any message destined for an end-user can be placed in a message bundle. A message bundle is simply a properties text file that contains key=value pairs that allow a user to internationalize messages. When a locale and national language are specified at run time, the contents of the message can be interpreted, based upon the key=value pair, and the message can be presented to the user in the correct language.

A final step in configuring a development environment can be to configure logging. Logging can be accomplished using a logging tool such as Log4j, developed as part of the Apache Jakarta project. For event adapters, a user can create a logging category specifically for event generation. The user can edit the logging configuration file for the specific adapter by, for example, adding the following code:

<categoryname='ADK.EventGenerator'
        class='com.logging.LogCategory'>
    </category>

The user can replace "ADK" with a adapter logical name. By not setting any specific parameters for this category, it can inherit all of the parent category's property settings.

Implementing an event adapter can be a two-step process. In such a process, a user can create an event generator. This process can implement the data extraction method and the IeventGenerator interface. This interface can be used by the event router to drive the event generation process. A user can also implement the data transformation method.

Event generation can provide an adapter with a mechanism to either receive a notification from an EIS or poll an EIS for the specific occurrence of an event. The event generation provided by an application integration engine can be very powerful, in that a single event generator can support multiple types of events. An event type can be defined by the configuration properties for an event.

Event properties can be defined by the properties associated with an event at design time. When configuring an event adapter, the adapter can have one or more Web pages that it uses to collect event properties. These properties can be saved with the application view descriptor and passed back to the event at run time. The application integration engine can use the properties and the source application view to determine how to route back to the listeners. For instance, two separate deployments of the same event generator with identical properties can result in only a single IEventDefinition being created by the application integration engine. Whereas, a single IEventDefinition can be created for every deployment of a single event adapter where the properties are different. It can be the responsibility of the event generator to determine which IEventDefinition to use in the routing process. This can be done based on property values and specific event occurrences.

The IEventDefinition objects can be used by a user implementation of the event generator to route specific events back to their listener. An application integration engine can create IEventDefinition objects for deployed application views containing events. The IEventDefinition objects can be used to extract specific properties regarding the deployment of an application view, or to access schema and routing objects. These attributes should be deployed when routing an event in some embodiments.

Data Extraction Mechanism

At least two mechanisms can be used to support data extraction as discussed above, including a "push" mechanism and a "pull" mechanism. For push event generation, a state change can be recognized when the object generating events pushes a notification to the event generator. When the Push Event generator receives the event, the application integration engine can route the event to a deployed application view. The push event generator can use a publish/subscribe model.

Pull event generation can be used when polling is necessary to accomplish the determination of a state having changed. A process can continually query an object until it has determined a change in state, at which point it creates an event, which can be routed to a deployed application view. The pull mechanism can rely on a polling technique to determine whether an event has taken place.

An ADK can supply several abstract methods in an AbstractPullEventGenerator that a user can override in an implementation. One such method is postEvents( ). A postEvents( ) method can be called from a run method in an AbstractPullEventGenerator at an interval that is determined by the Event Router configuration files. The postEvents( ) method can be used to add any polling and routing code. The postEvents( ) method can be used as a control method for the rest of the event generation, message transformation, and routing code.

A setupNewTypes( ) method can be used to preprocess any IEventDefinition object being deployed. Valid new IEventDefinition objects can be passed to the setupNewTypes( ) method. A removeDeadTypes( ) can be used to handle any clean up required for IEventDefinition objects that are being un-deployed. An application integration engine can call removeDeadTypes( ) when application views with associated events are being un-deployed.

A doInit( ) method can be called while the event generator is being constructed. During the initialization process the event generator can use pre-defined configuration values to set up the necessary state or connections for the event generation process. A doCleanUponQuit( ) method can be called before ending the thread driving the event generation process. This method can be used to free any resources allocated by the event generation process.

The Push scenario can use notification to trigger the routing of an event. To implement the Push scenario, a user can derive an event generator from an AbstractPushEventGenerator class. There can be several other supporting classes included in an event package. One such class is AbstractPushEventGenerator, which can contain the same abstract and concrete methods as the AbstractPullEventGenerator. These methods can be used in the same manner as the AbstractPullEventGenerator implementation.

Another such class is IpushHandler, which can be used as an interface used primarily to abstract the generation of an event from the routing of an event. This is not required to implement a Push scenario. The IPushHandler is intended to be tightly coupled with the PushEventGenerator. It is the PushEventGenerator that will initialize, subscribe, and clean up the PushHandler implementation. The IPushHandler can provide a simple interface to abstract the generation logic.

The interface can provide methods to initialize, subscribe to Push events, and clean up resources.

Another class is PushEvent, an event object that can be derived from java.util.EventObject. The PushEvent is intended to wrap an EIS notification and be sent to any IPushEventListener objects. EventMetaData is a class that can wrap any data necessary for event generation. The EventMetaData class can be passed to the IPushHandler on initialization.

One approach to implementing an event generator is as follows. A doInit( ) method can be used to creates and validates connections to an EIS. A setupNewTypes( ) method can be used to process IEventDefinition objects, creating any required structures for processing. A postEvents( ) method can iteratively invoke one of the data extraction mechanisms. For a push mechanism, the method can poll the EIS for an event. If the event exists, the method can determine which IEventDefinition objects will receive the event, and can transform event data into an IDocument object using the associated schema. The method can route the IDocument object using the IEvent associated with the IEventDefinition object.

For a pull mechanism, a postEvents( ) method that is notified of an event can extract the event data from the PushEvent object and transform the event data to an IDocument object. The IDocument object can be created based on the schema associated with the event adapter. When the IDocument contains the necessary event data, it can be routed to the correct IEventDefinition objects.

A removeDeadTypes( ) method can remove the dead IEventDefinition objects from any data structures being used for event processing, and can free any associated resources. IEventDefinition objects can be considered "dead" when the application view is undeployed. A doCleanUpOnQuit( ) method can remove any resources allocated during event processing.

Data Transformation Method

Data transformation is a process for taking data from an EIS and transforming it into an XML schema that can be read by an application server. For each event, a schema can define what the XML output looks like. This can be accomplished by using SOM and IDocument class libraries. An example of a valid XML document created by such a schema can be given by:

</xsd:schema>
<?xml version="1.0"?>
<!DOCTYPE SENDINPUT>
<SENDINPUT>
  <TO/>
  <FROM/>
  <CC/>
  <BCC/>
  <BCC/>
  <BODY/>
</SENDINPUT> <xsd:schema xmins:xsd="http://www.w3.org/2001/XMLSchema">

Deploying an Adapter

After building or rebuilding a new event adapter, the new adapter can be deployed into an integration system. An adpater can be deployed manually, or can be deployed from a component such as an application server console. For event adapters, a user can implement a method such as initEventDescriptor( ) so the adapter user can add events at design time. This method can be given by, for example:

```
protected abstract void
    initEventDescriptor(ActionResult result,
        IEventDescriptor ed,
        HttpServletRequest request)
    throws Exception;
```

This method can be invoked by an addevent( ) implementation of a request handler such as AbstractDesignTimeRequestHandler. The implementation can be responsible for initializing EIS-specific information of a descriptor parameter such as IServiceDescriptor. A base class implementation of addevent( ) can handle concepts such as, for example, error handling. An addevent( ) method can be invoked when a user submits an addevent JSP. A user may not wish to override addevent, as it can contain common logic and delegate EIS-specific logic to a method such as initEventDescriptor( ).

When adding properties to a service descriptor, the property names can follow the bean name standard. Otherwise, the service descriptor may not update the InteractionSpec correctly. The user can create edtservc.jsp and addservc.jsp pages. These Java server pages can be called in order to provide editing capabilities. One difference between edit JSPs and add JSP files is the loading of descriptor values. For this reason, the DBMS and e-mail adapters can use the same HTML for both editing and adding. These HTML files can be statically included in the JSP page. This can prevent the unnecessary duplication of JSP, HTML, and associated properties. The descriptor values can be mapped into controls, such as may be displayed on an edit page. From there, the user can submit any changes.

In order to initialize the controls with values defined in the descriptor, a method such as loadEvent/ServiceDescriptorProperties( ) can be called on the AbstractDesignTimeRequestHandler. Such a method can be used to set properties of the service into the RequestHandler. Once these values are set, the RequestHandler can map the values to the ADK controls being used in the JSP file. The default implementation of the method can use the property name associated with the ADK tag to map the descriptor values. If values are used other than the ADK tag names to map the properties for a service or event, these methods can be overridden to provide the descriptor to the ADK tag-name mapping. The user can initialize the RequestHandler prior to the resolution of HTML. This initialization should only take place once in some embodiments.

Adapter Setup

A user can identify and collect critical information about an adapter being developed. Such information can help to define such components as the adapter logical name and the Java package base name, and can help to determine the locales for which localized message bundles are needed. For example, a user may wish to determine the name of the EIS for which the adapter is being developed, as well as the version of the EIS and the type of EIS, such as DBMS or ERP. The user may wish to determine the vendor name for the adapter, as well as the version number for the adapter and the adapter logical name. The user can determine whether the adapter needs to invoke functionality within the EIS and, if so, which services the adapter needs to support. The user can determine which mechanism or API is provided by the EIS to allow an external program to invoke functionality provided by the EIS. The user can also determine what information is needed to create a session and/or connection to the EIS for this mechanism.

The user can obtain the information needed to determine which function(s) will be invoked in the EIS for a given service. The user may wish to know whether the EIS allows a user to query for input and output requirements for a given function, and if so, the information needed to determine input requirements for the service. For all the input requirements, a user may want to know which ones are static across all requests. An adapter can encode static information into an InteractionSpec object. For all the input requirements, the user can determine which ones are dynamic per request. An adapter can provide an XML schema that describes the input parameters required by this service per request, and any information needed to determine output requirements for the service.

Other information that a user may wish to obtain can include whether the EIS provides a mechanism to browse a catalog of functions the adapter can invoke, and if so, whether the adapter should support the browsing of services. The user can learn whether the adapter needs to receive notifications of changes that occur inside the EIS. If so, the adapter may need to support events. The user can obtain information relating to the mechanism or API that is provided by the EIS to allow an external program to receive notification of events in the EIS. This can help determine whether a pull or a push mechanism should be developed. It can be determined whether the EIS provides a way to determine which events the adapter can support, and whether the EIS provides a way to query for metadata for a given event. The user may also wish to obtain a list of locales and languages that the adapter needs to support.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer system having a processor and a computer readable storage medium for connecting a client application to an enterprise system, said computer system comprising:
   a service adapter that invokes a specific function in the enterprise system to update at least one record in a database, said service adapter being stored on the computer readable storage medium;
   an event adapter that enables the enterprise system to initiate communication with the client application by triggering an event within the enterprise system, said event adapter being stored on the computer readable storage medium, wherein the event represents an action occurring in the enterprise system, the client application having registered its interest to be notified of the action's occurrence; and
   an application view component that integrates the client application with the enterprise system by providing the client application with a unified interface to services and events in the enterprise system, wherein said services are exposed by the service adapter and said events are exposed by the event adapter, said application view component being stored on the computer readable storage medium;
   wherein the event adapter reads data that describes the event from the enterprise system and transforms the data from a format specific to the enterprise system into an XML-based object and notifies the application view component; and
   wherein the application view component extracts the data about the event from the enterprise system through the event adapter and propagates the data in the XML-based object to the client application and further provides the client application with an XML schema that describes the XML-based object.

2. The computer system according to claim 1, wherein:
the event adapter allows the enterprise system to initiate communication with the client application only for types of events specified by the client application.

3. The computer system according to claim 1, wherein:
the application view component is further adapted to propagate the data in an XML document.

4. The computer system according to claim 1, wherein:
the event adapter is further adapted to extract data about the event from the enterprise system, and makes that data available to the application view component.

5. The computer system according to claim 1, wherein:
the event adapter is adapted to transform the data from a format specific to the enterprise system to an XML document.

6. The computer system according to claim 5, wherein the XML schema is based on metadata in the enterprise system.

7. The computer system according to claim 6, wherein:
the XML document conforms to the XML schema.

8. The computer system according to claim 1, wherein:
the event adapter is Java 2 Enterprise Edition (J2EE) compliant.

9. The computer system according to claim 1, wherein:
the event adapter has an adapter logical name that represents the event adapter.

10. The computer system according to claim 1, wherein:
the application view component is further adapted to allow the client application to register interest in a type of event.

11. The computer system according to claim 10, wherein:
the application view component is further adapted to notify the client application whenever an event within the target application for which the client application has registered interest.

12. The computer system according to claim 1, wherein:
the event adapter is further adapted to allow for asynchronous messaging between the enterprise system and the client application.

13. The computer system according to claim 1, wherein:
the event adapter is further adapted to allow bi-directional communication.

14. The computer system according to claim 1, wherein:
the event adapter is further adapted to support an event at the business level.

15. The computer system according to claim 1, wherein:
the event adapter is an in-process event adapter, adapted to execute within the same process as the enterprise system for extracting event data.

16. The computer system according to claim 1, wherein:
the event adapter is an out-of-process adapter, adapted to execute in a separate process than the enterprise system for extracting event data.

17. The computer system according to claim 1, wherein:
the event adapter is further adapted to propagate the data for the event to an event context, the event context being obtained from the application view component.

18. The computer system according to claim 1, wherein: the event adapter is not specific to the enterprise system or client application.

19. The computer system according to claim 1, wherein: the event adapter can be plugged into any application server that supports the Java 2 Enterprise Edition (J2EE) Connector Architecture specification.

20. The computer system according to claim 1, wherein: the event adapter further comprises a user interface adapted to deploy application view components.

21. The computer system according to claim 1, further comprising
a connector architecture mechanism adapted to provide at least one of connection pooling, transaction management, and security services for the event adapter.

22. The computer system according to claim 1, further comprising:
a call-back listener adapted to handle a response for the application view that is received from the enterprise system.

23. The computer system according to claim 1, further comprising:
a Java Messaging Service (JMS) queue adapted to receive a request from the application view component and store the request until the request is passed to the enterprise system.

24. The computer system according to claim 1, further comprising:
an event generator adapted to generate an event for the enterprise system and post the event.

25. The computer system according to claim 24, further comprising:
an event router adapted to receive the post of the event from the event generator and route the event to a location where the event can be retrieved by the application view component.

26. The computer system according to claim 25, wherein: the event router routes the event by publishing the event as an event message to an application view topic.

27. The computer system according to claim 26, further comprising:
an event listener adapted to listen to the application view topic.

28. The computer system according to claim 1, wherein: the event adapter further comprises at least one Web page adapted to allow the event adapter to collect properties for the event.

29. The computer system according to claim 1, wherein: the event service adapter is further adapted to transform data passing between the enterprise system and the client application.

30. The computer system according to claim 29, wherein: the event adapter uses XML to transform the data.

31. The computer system according to claim 1, further comprising:
a run-time engine adapted to host the event adapter.

32. The computer system according to claim 31, wherein: the run-time engine is further adapted to manage connections to the enterprise system.

33. The computer system according to claim 1, further comprising:
a managed connection instance for the event adapter, encapsulating resources necessary to communicate with the enterprise system.

34. The computer system of claim 1 wherein the application view is specific to a single adapter and defines a view of functions exposed by said single adapter.

35. The computer system of claim 1 wherein the application view brokers requests between the enterprise system and external applications.

36. A computer implemented method for propagating an event from an underlying enterprise system through an event adapter, comprising:
maintaining a service adapter that invokes a specific function in the enterprise system, said service adapter being stored on a computer readable storage medium;
maintaining an application view component implemented on top of the service adapter, wherein said application view component integrates a client application with the enterprise system by providing the client application with a unified interface to services and events in the enterprise system, said application view component being stored on the computer readable storage medium;
generating an event in the enterprise system, wherein the event represents an action occurring in the enterprise system, the client application having registered its interest to be notified of the action's occurrence;
extracting data for the event from the enterprise system;
transforming the data for the event from enterprise specific format into an event message in an extensible markup language format;
routing the event message to a listener;
extracting the event message from the listener;
propagating the event message to the client application by the application view component; and
providing a schema that describes the event message to the client application, the schema based on metadata in the enterprise system.

37. The computer implemented method according to claim 36, wherein:
transforming the data further comprises transforming the data into an XML document.

38. A computer implemented method for pulling an event from an underlying enterprise system through an event adapter, comprising:
maintaining a service adapter that invokes a specific function in the enterprise system, said service adapter being stored on a computer readable storage medium;
maintaining an application view component implemented on top of the service adapter, wherein said application view component integrates a client application with the enterprise system by providing the client application with a unified interface to services and events in the enterprise system, said application view component being stored on the computer readable storage medium;
requesting an event from an enterprise system, wherein the event represents an action occurring in the enterprise system, the client application having registered its interest to be notified of the action's occurrence;
extracting data for the event from the enterprise system;
transforming the data for the event from an enterprise specific format into an event message in XML format;
routing the event message to a component requesting the event by the application view component; and
providing the component requesting the event with an XML schema that describes the event message such that the component is able to read the event message.

* * * * *

UNITED STATES PATENT AND TRADEMARK OFFICE
CERTIFICATE OF CORRECTION

PATENT NO. : 7,552,443 B2  Page 1 of 1
APPLICATION NO. : 10/271157
DATED : June 23, 2009
INVENTOR(S) : Mitch Upton It is certified that error appears in the above-identified patent and that said Letters Patent is hereby corrected as shown below:

Title page 3, in column 1, under "Foreign Patent Documents", line 1, delete "1 061 455" and insert -- 1 061 445 --, therefor.

Title page 3, in column 2, under "Other Publications", line 7, delete "on" and insert -- of --, therefor.

Title page 3, in column 2, under "Other Publications", line 18, delete ""Jamper-Jave" and insert -- "Jamper-Java --, therefor.

Title page 3, in column 2, under "Other Publications", line 51, delete "XLM-Based" and insert -- XML-Based --, therefor.

Title page 4, in column 1, under "Other Publications", line 10, delete "Persistant" and insert -- Persistent --, therefor.

In column 3, line 13, delete "also," and insert -- also --, therefor.

In column 8, line 40, delete "approprite" and insert -- appropriate --, therefor.

In column 10, line 32, delete "El S-specific" and insert -- EIS-specific --, therefor.

In column 12, line 24, delete "ear" and insert -- .ear --, therefor.

In column 15, line 57, delete "xmins:xsd="http://" and insert -- xmlns:xsd="http:// --, therefor.

In column 15, line 63, delete "adpater" and insert -- adapter --, therefor.

In column 19, line 12, in claim 21, after "comprising" insert -- : --.

Signed and Sealed this

Sixth Day of July, 2010

David J. Kappos
*Director of the United States Patent and Trademark Office*